Dec. 30, 1924.
M. LUND
1,521,247
VALVE AND VALVE CONNECTION
Filed Dec. 15, 1922
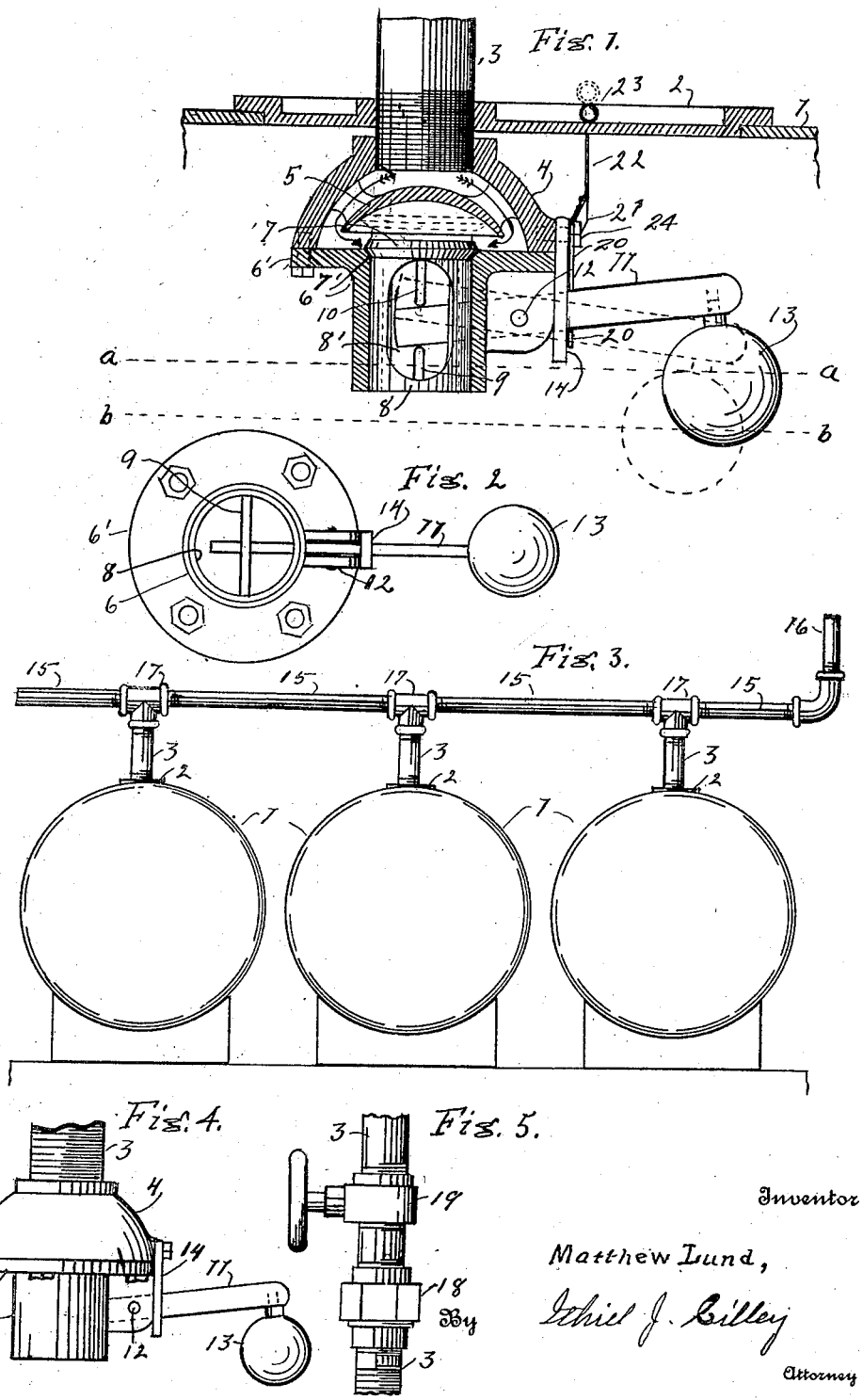
Inventor
Matthew Lund,
By Ithiel J. Gilley
Attorney Patented Dec. 30, 1924.

1,521,247

UNITED STATES PATENT OFFICE.

MATTHEW LUND, OF GRAND RAPIDS, MICHIGAN, ASSIGNOR TO VALLEY CITY MACHINE WORKS, OF GRAND RAPIDS, MICHIGAN.

VALVE AND VALVE CONNECTION.

Application filed December 15, 1922. Serial No. 607,188.

*To all whom it may concern:*

Be it known that I, MATTHEW LUND, a citizen of the United States, residing at Grand Rapids, in the county of Kent and State of Michigan, have invented certain new and useful Improvements in Valves and Valve Connections, of which the following is a specification.

My invention relates to improvements in valves for use in filling oil tanks, kerosene tanks and like receptacles, and its objects are: first, to provide a valve that will close automatically as soon as the tank has been filled to the desired capacity; second, to provide a means whereby the automatic closing of my valve in one tank will provide a means whereby a second tank will be filled, and so on until the supply tank has been exhausted, or until all of the receiving tanks have been filled, and, third, to provide a means whereby a filled tank may be readily disconnected from the supply pipe without danger of wasting oil, etc., from the supply pipes.

I attain these objects by the mechanism and disposition of parts shown in the accompanying drawings, in which Fig. 1 is a transverse vertical section of my valve showing its internal construction. Fig. 2 is a bottom plan of the valve and valve case. Fig. 3 is an elevation of a number of tanks connected up for filling successively, as with my valve connections. Fig. 4 is an elevation of my valve disconnected from the tank, and, Fig. 5 shows the connecting pipe with a cutoff valve and a union connection thereon.

Similar reference numerals indicate similar parts throughout the several views.

In the accompanying drawing 1 represents the tank to be filled; 2 is the manhole of the tank and 3 indicates the connecting pipe that leads from the conveyor pipe 15 into the tank and to which the valve 4 is connected, within the tank.

The valve casing consists of a cap 4 and a barrel 6 in which the valve seat 7' is formed for the proper seating of the valve 7, said valve carrying a barrel 8 having openings through its walls, as indicated at 8', through which oil, etc., flowing downwardly through the pipe 3 may pass, as indicated by the arrows in Fig. 1, said oil first flowing upon the partition 5 and thence over, as indicated by the arrows, and, with the valve 7 raised into the position indicated by its dotted lines in Fig. 1, the oil will flow into and through the barrel 6, which is hollow as indicated in Fig. 2, and thence downwardly into the tank 1 until the float 13 is raised sufficiently to throw the valve firmly upon its seat. To accomplish this I pivot a lever 11 into supporting bearings, as at 12, and arrange it to act upon the bearings 9 and 10, in the body of the valve or valve barrel. When the valve is properly seated upon the seat 7' no more oil can flow past it into the tank, and if the supply in the filling tank is not exhausted the surplus will be forced to flow on through the conveyor pipe 15 into succeeding tanks until all tanks are filled, or the oil is exhausted from the filling tank, not shown in this instance. The stand pipe 16 is presumed to lead from said filling tank into the tank pipes 15, and thence through the T's 17 and the feed pipes 3, into the tanks. 14 represents a steadying bar for holding the lever in proper position, and 6' is the rim or flange of the body 6 by means of which said body is securely bolted to the cap 4, as indicated.

If it is desired to remove one or more of the tanks, after having filled them, I have provided for so doing by inserting a cut off valve, 19, and a pipe union, 18, into the pipe 3, between the pipe 15 and the tank 1, so this pipe may be readily shut off, and as readily disconnected, thus cutting off all possibility of oil flowing through the pipe 3 even though it be disconnected from the tank.

I have shown the valve as connected with the manhole plate, 2, of the tank as the most convenient means whereby it may be entered into, or removed from the tank.

It will be readily understood that when the contents of the tank, that is the oil with which it is being filled, is at or below the line *b—b* the float will be located in the position of its dotted lines in Fig. 1 and the valve 7 will be unseated so oil may pass through into the tank unobstructed, but if the oil raises to the line *a—a* the float will be raised and the valve closed, shutting off further flow of oil into the tank.

20 represents a swinging latch that is pivotally connected with the valve casing, as at 24, and is designed to be automatically swung under the lever 11 by the weight of the arm 21, and held in place to prevent the valve from becoming unseated after it has been forced upon its seat by the float 13, as hereinbefore described. 21 is an arm that is formed integral with and positioned at right angles from said latch 20, and 22 is a rod that is attached, at one end, to said arm and the other end provided with a hand piece 23 by means of which it may be drawn upwardly to disengage the latch from the lever, when desired.

The lenticular formed partition 5 is designed to avert the possibility of oil that is passing through the pipe 3 from striking directly upon the valve 7, either when this valve may be opened or closed, and, by this means I am able to cause the oil to pass through the valve opening in a steady, unbroken stream, and much more readily and freely than if it was allowed to flow directly upon the flat surface of the valve.

Having thus fully described my invention, what I claim as new in the art, is:—

1. In an automatically operated cut off valve for oil tanks, a feed pipe, a chambered cap connected with said pipe, an annular barrel having a valve seat formed thereon, an integral flange on the upper end of said barrel for connection with the cap to form a receiving chamber, a lenticular formed partition in the chamber in the cap forming an annular passageway between said partition and the walls of the cap, a valve having a long annularly formed barrel slidable in said annular barrel, said valve barrel having openings through the sides for the free passage of oil when the valve is open, bearings formed within the valve barrel, a lever pivotally mounted upon the first named barrel and engaging said bearings at one end, a float at the other end of said lever arranged to actuate the lever with the rising and lowering of the liquid contents of the tank.

2. In combination with the elements covered in claim 1, an air tank into which the feed pipe extends, and a conveyer pipe connected with the feed pipe.

3. In combination with the elements covered in claim 1, a swinging latch arranged to automatically lock the valve in place, when seated, by the action of the float lever.

4. In combination with the elements covered in claim 1, a latch pivotally connected with the first named barrel and arranged to engage the float lever and automatically lock the valve in place when seated, and means for disengaging the latch from the float lever and releasing the valve.

Signed at Grand Rapids, Michigan, November 22, 1922.

MATTHEW LUND.